(12) United States Patent
Byeon (10) Patent No.: US 9,094,183 B2
(45) Date of Patent: Jul. 28, 2015

(54) CIRCUITS FOR RECEIVING DATA

(71) Applicant: SK hynix Inc., Icheon-si (KR)

(72) Inventor: Sang Yeon Byeon, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 106 days.

(21) Appl. No.: 13/719,001

(22) Filed: Dec. 18, 2012

(65) Prior Publication Data

US 2014/0050284 A1     Feb. 20, 2014

(30) Foreign Application Priority Data

Aug. 20, 2012    (KR) .......................... 10-2012-0090936

(51) Int. Cl.
*H04L 7/02*      (2006.01)
*H04L 7/033*     (2006.01)
*H04L 7/00*      (2006.01)

(52) U.S. Cl.
CPC ............ *H04L 7/0331* (2013.01); *H04L 7/0337* (2013.01); *H04L 7/0008* (2013.01); *H04L 7/0041* (2013.01)

(58) Field of Classification Search
CPC . H03F 2200/336; H03F 1/0227; H03F 3/245; H03F 3/195

USPC .......................................................... 375/355
See application file for complete search history.

(56) References Cited

U.S. PATENT DOCUMENTS

2009/0116313 A1*   5/2009   Jang ............................... 365/194
2011/0138217 A1*   6/2011   Kurimoto ...................... 713/600

FOREIGN PATENT DOCUMENTS

KR     1020070088205 A     8/2007
KR     1020080044543 A     5/2008

* cited by examiner

*Primary Examiner* — Tanmay Shah
(74) *Attorney, Agent, or Firm* — Kilpatrick Townsend & Stockton LLP (57) ABSTRACT

A receiving circuit includes a clock input portion configured to buffer a first pattern signal and configured to retard the buffered first pattern signal by a first delay time to generate an input clock signal, a data input portion configured to buffer a second pattern signal and configured to retard the buffered second pattern signal by a second delay time to generate an input data signal, and a comparator configured to compare a phase of the input clock signal with a phase of the input data signal to generate a comparison signal for adjusting the second delay time.

25 Claims, 6 Drawing Sheets

CIRCUITS FOR RECEIVING DATA

CROSS-REFERENCE TO RELATED APPLICATION

The present application claims priority under 35 U.S.C 119(a) to Korean Application No. 10-2012-0090936, filed on Aug. 20, 2012, in the Korean Intellectual Property Office, which is incorporated herein by reference in its entirety.

BACKGROUND

Integrated circuits of semiconductor memory devices may receive and/or transmit digital signals including data with a logic "1(high)" level and/or a logic "0(low)" level. Thus, integrated circuits may include a receiving circuit for accepting data and/or a transmitting circuit for outputting data.

In general, a receiving circuit may receive input data in synchronization with a clock signal having a clock pulse and may discriminate whether the input data has a logic "1" level or a logic "0" level. In order that the receiving circuit to correctly determine the logic level of the input data, the clock pulse of the clock signal may occur at the middle of a period for which the input data is input. That is, when the clock pulse of the clock signal occurs at the middle of the period for which the input data is input, the receiving circuit may have a sufficient margin to accurately discriminate the logic level of the input data with a smaller number of errors.

In some cases, the clock pulse of the clock signal may not occur at the middle of the activation period of the input data due to a skew between the input data and the clock signal. In such a case, the receiving circuit may erroneously discriminate the logic level of the input data to cause errors.

SUMMARY

Embodiments are directed to circuits for receiving data.

According to some embodiments, a circuit for receiving data includes a clock input portion configured to buffer a first pattern signal and configured to retard the buffered first pattern signal by a first delay time to generate an input clock signal, a data input portion configured to buffer a second pattern signal and configured to retard the buffered second pattern signal by a second delay time to generate an input data signal, and a comparator configured to compare a phase of the input clock signal with a phase of the input data signal to generate a comparison signal for adjusting the second delay time.

According to further embodiments, a circuit for receiving data includes a clock input portion configured to buffer a first pattern signal and configured to retard the buffered first pattern signal by a first delay time to generate an input clock signal, a first data input portion configured to buffer a second pattern signal and configured to retard the buffered second pattern signal by a second delay time to generate a first input data signal, a first comparator configured to compare a phase of the input clock signal with a phase of the first input data signal to generate a first comparison signal for adjusting the second delay time, a second data input portion configured to buffer a third pattern signal and configured to retard the buffered third pattern signal by a third delay time to generate a second input data signal, and a second comparator configured to compare a phase of the input clock signal with a phase of the second input data signal to generate a second comparison signal for adjusting the third delay time.

Additional embodiments will be apparent based on the details provided below.

BRIEF DESCRIPTION OF THE DRAWINGS

Embodiments will be apparent in view of the attached drawings and accompanying detailed description, in which.

DETAILED DESCRIPTION OF THE EMBODIMENTS

Embodiments will be described more fully hereinafter with reference to the accompanying drawings. However, the example embodiments described herein are for illustrative purposes only and are not intended to limit the scope of the inventive concept. Various embodiments may describe receiver circuits that identify when a skew between a clock signal and a data signal is larger than a threshold, and adjust a delay on one of the signals in response to the identification of the excessive skew between the signals. This reduces the skew or timing mismatch between the signals, and reduces the potential for errors.

Figure 1:
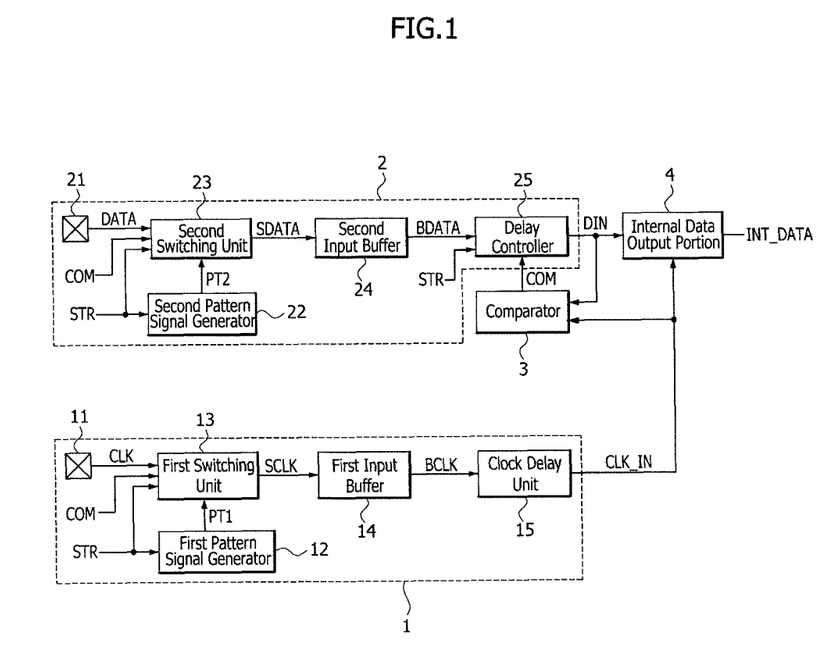
FIG. 1 is a block diagram illustrating a configuration of a receiving circuit according to some embodiments.

FIG. 1 is a block diagram illustrating a configuration of a receiving circuit according to some embodiments. As illustrated in FIG. 1, a receiving circuit according to an example embodiment may be configured to include a clock input portion 1, a data input portion 2, a comparator 3 and an internal data output portion 4. The clock input portion 1 may be configured to include a first pad 11, a first pattern signal generator 12, a first switching unit 13, a first input buffer 14 and a clock delay unit 15. The data input portion 2 may be configured to include a second pad 21, a second pattern signal generator 22, a second switching unit 23, a second input buffer 24 and a delay controller 25.

The first pattern signal generator 12 may generate a first pattern signal PT1 in response to a pulse of a starting signal STR. The second pattern signal generator 22 may generate a second pattern signal PT2 in response to the pulse of the starting signal STR. In such an embodiment, the first and second pattern signals PT1 and PT2 may be generated to have the same waveform. However, in some alternative embodiments, the second pattern signal PT2 may be generated to have a different cycle time and a different pulse width from the first pattern signal PT1. The pulse of the starting signal STR may be generated for a simulation operation that generates an internal data signal INT_DATA according to the first and second pattern signals PT1 and PT2.

The first switching unit 13 may output the first pattern signal PT1 as a selection clock signal SCLK in response to the pulse of the starting signal STR when a comparison signal COM is enabled. The second switching unit 23 may output the second pattern signal PT2 as a selection data signal SDATA in response to the pulse of the starting signal STR when the comparison signal COM is enabled. When the comparison signal COM is disabled after receiving the pulse of the starting signal STR, the first switching unit 13 may output a clock signal CLK which was input through the first pad 11 as the selection clock signal SCLK. Similarly, when the comparison signal COM is disabled after receiving the pulse of the starting signal STR, the second switching unit 23 may output a data signal DATA input through the second pad 21 as the selection data signal SDATA.

The first input buffer 14 may buffer the selection clock signal SCLK to generate a buffer clock signal BCLK. The second input buffer 24 may buffer the selection data signal SDATA to generate a buffer data signal BDATA. The clock delay unit 15 may retard the buffer clock signal BCLK by a first delay time to generate an input clock signal CLK_IN. The delay controller 25 may retard the buffer data signal BDATA by a second delay time to generate an input data signal DIN. The second delay time may be adjusted according to the starting signal STR and the comparison signal COM. A configuration and an operation of the delay controller 25 will be described in additional detail with reference to FIG. 2 below.

The comparator 3 may compare a phase of the input clock signal CLK_IN with a phase of the input data signal DIN to generate the comparison signal COM. The internal data output portion 4 may latch the input data signal DIN in synchronization with the input clock signal CLK_IN to generate the internal data signal INT_DATA.

Figure 2:
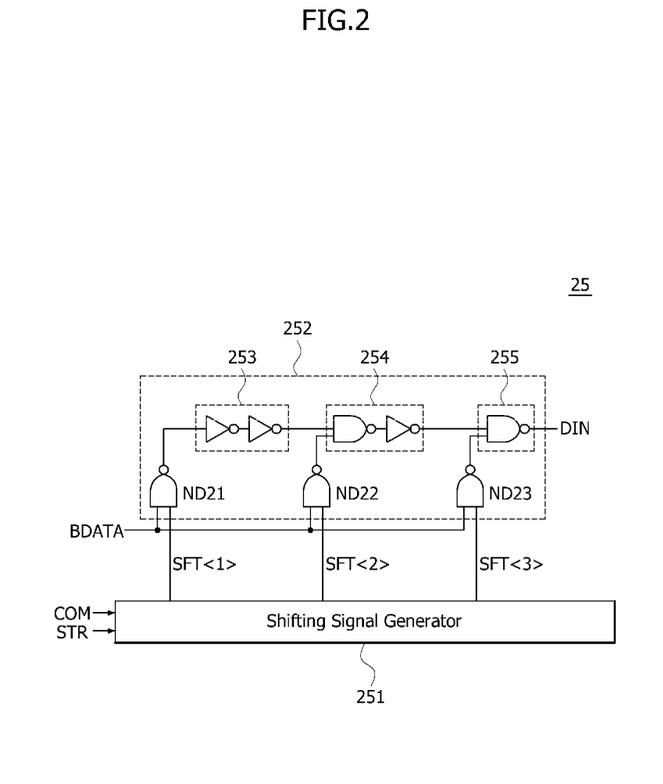
FIG. 2 is a block diagram illustrating an example of a delay controller included in the receiving circuit of FIG. 1 according to some embodiments.

FIG. 2 is a block diagram illustrating one potential embodiment of the delay controller 25 included in the receiving circuit of FIG. 1. As illustrated in FIG. 2, the delay controller 25 may be configured to include a shifting signal generator 251 and a delay selector 252. Shifting signal generator essentially receives a comparison signal indicating whether there is a skew mismatch, and setting a delay based on this information. The shifting signal generator 251 may generate first, second and third shifting signals SFT<1:3> which are initialized when receiving the pulse of the starting signal STR. Subsequently, the shifting signal generator 251 may shift the first, second and third shifting signals SFT<1:3> when the comparison signal COM is enabled. The selection of the first, second, and third shifting signals may set a delay to bring a skew between clock and data signals below a delay threshold.

For example, the shifting signal generator 251 may generate the first, second and third shifting signals SFT<1:3>, which are initialized to have respective ones of "L", "H" and "L", in response to the pulse of the starting signal STR. Subsequently, if the comparison signal COM is enabled, the first, second and third shifting signals SFT<1:3> may be shifted to have respective ones of "H", "L" and "L". The terms "H" and "L" used herein mean a logic "high" level and a logic "low" level, respectively.

When the first shifting signal SFT<1> has a logic "high" level and both the second and third shifting signals SFT<2:3> have logic "low" levels, the delay selector 252 may receive the buffer data signal BDATA through a NAND gate ND21 and may buffer the buffer data signal BDATA using first to third buffers 253, 254 and 255 to generate the input data signal DIN. When the second shifting signal SFT<2> has a logic "high" level and both the first and third shifting signals SFT<1> and SFT<:3> have logic "low" levels, the delay selector 252 may receive the buffer data signal BDATA through a NAND gate ND22 and may buffer the buffer data signal BDATA using the second and third buffers 254 and 255 to generate the input data signal DIN. When the third shifting signal SFT<3> has a logic "high" level and both the first and second shifting signals SFT<1:2> have logic "low" levels, the delay selector 252 may receive the buffer data signal BDATA through a NAND gate ND23 and may buffer the buffer data signal BDATA using the third buffer 255 to generate the input data signal DIN. Thus, the second delay time incurred by the delay controller 25 may have a maximum value when the first shifting signal SFT<1> has a logic "high" level and may have a minimum value when the third shifting signal SFT<3> has a logic "high" level. In the present embodiment, the second delay time occurred by the delay controller 25 may decrease whenever the first to third shifting signals SFT<1:3> are shifted. In various alternative embodiments, the second delay time may function to shift either a delay in either the clock signal or the data signal, in order to shift the skew of the two signals below a timing mismatch threshold. This is further detailed in FIGS. 4-5 below. Additionally, while the embodiment of FIG. 2 shows a system with three shifting signals, any number of shifting signals may be used to accommodate an appropriate level of skew reduction. Additionally, in certain embodiments, the amount of delay associated with each shifting signal may be configurable to further accommodate an appropriate level of skew reduction.

Figure 3:
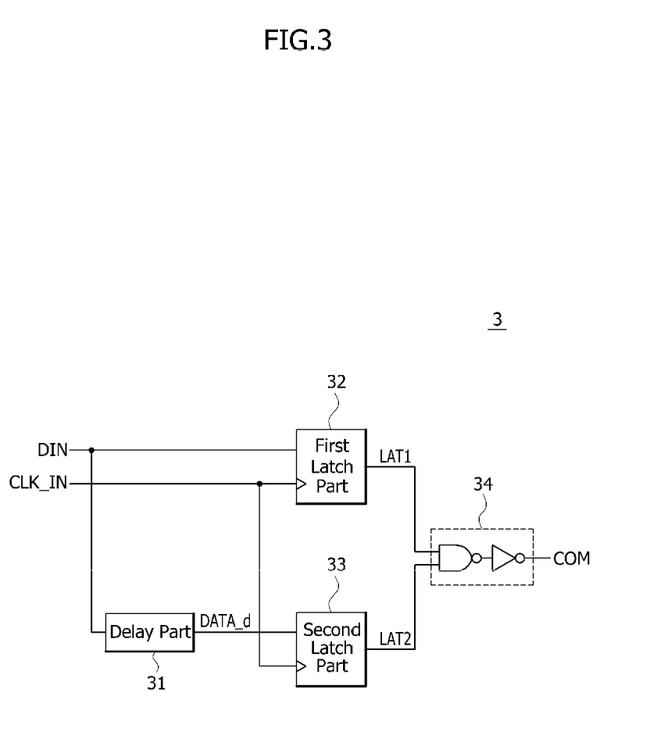
FIG. 3 is a block diagram illustrating an example of a comparator included in the receiving circuit of FIG. 1 according to some embodiments.

FIG. 3 is a block diagram illustrating an example of the comparator included in the receiving circuit of FIG. 1. As illustrated in FIG. 3, the comparator 3 may be configured to have a delay part 31, a first latch part 32, a second latch part 33 and a logic part 34. The delay part 31 may retard the input data signal DIN by a predetermined delay time to generate a delay data signal DATA_d. The first latch part 32 may latch the input data signal DIN in synchronization with a rising edge of the input clock signal CLK_IN to output the latched input data signal as a first latch signal LAT1. The second latch part 33 may latch the delay data signal DATA-d in synchronization with a rising edge of the input clock signal CLK_IN to output the latched delay data signal as a second latch signal LAT2. The logic part 34 may generate the comparison signal COM which is enabled to have a logic "high" level when both the first and second latch signals LAT1 and LAT2 have logic "high" levels.

Figure 4:
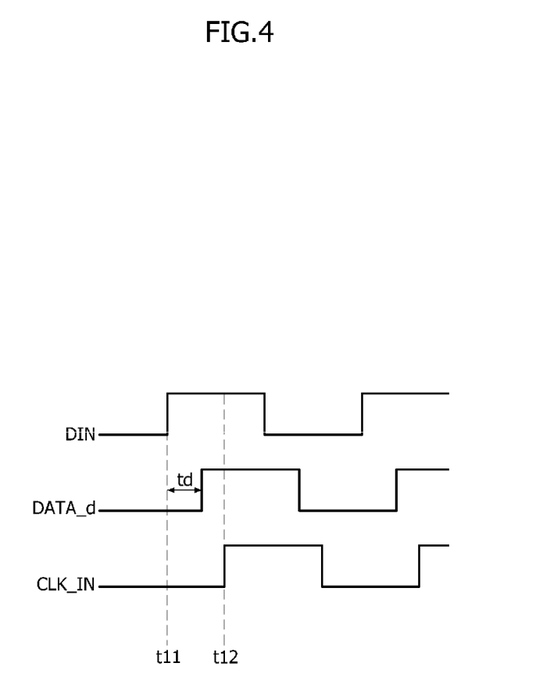
FIGS. 4 and 5 are timing diagrams illustrating an operation of the comparator of FIG. 3 according to some embodiments.
Figure 5:
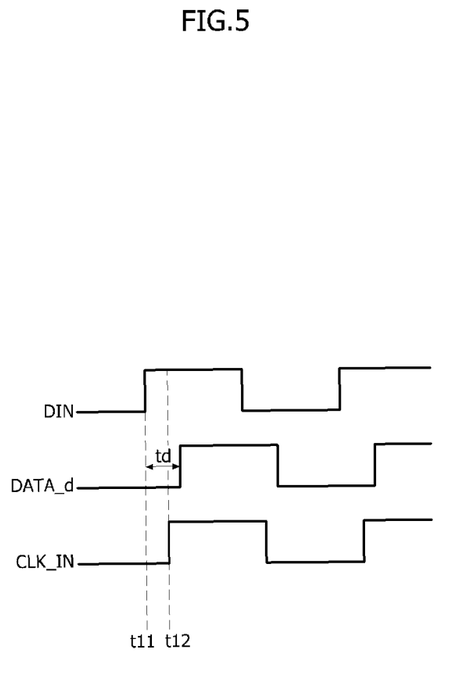

An operation of the comparator 3 will be described hereinafter with reference to FIGS. 4 and 5. FIGS. 4 and 5 are timing diagrams illustrating an operation of the comparator of FIG. 3.

As illustrated in FIG. 4, when a rising edge of the delay data signal DATA-d generated by retarding the input data signal DIN by a predetermined delay time Td is positioned between a rising edge t11 of the input data signal DIN and a rising edge t12 of the input clock signal CLK_IN, both the first and second latch signals LAT1 and LAT2 may be generated to have logic "high" levels to enable the comparison signal COM. That is, a phase difference between the input data signal DIN and the input clock signal CLK_IN is greater than the predetermined delay time Td, the comparison signal COM may be enabled.

As illustrated in FIG. 5, when a rising edge of the delay data signal DATA-d occurs after the rising edge t11 of the input data signal DIN and the rising edge t12 of the input clock signal CLK_IN, the first latch signal LAT1 may be generated to have a logic "high" level and the second latch signal LAT2 may be generated to have a logic "low" level. As a result, the comparison signal COM may be disabled. That is, a phase difference between the input data signal DIN and the input clock signal CLK_IN is less than the predetermined delay time Td, the comparison signal COM may be disabled.

An operation of the receiving circuit according to the above embodiment will be described hereinafter with reference to FIG. 1.

First, when a pulse of the starting signal STR is applied to the receiving circuit, the clock input portion 1 may buffer the first pattern signal PT1 and may retard the buffered first pattern signal by a first delay time to generate the input clock signal CLK_IN and the data input portion 2 may buffer the second pattern signal PT2 and may retard the buffered second pattern signal by a second delay time to generate the input data signal DIN.

Next, the comparator 3 may compare a phase of the input clock signal CLK_IN with a phase of the input data signal DIN to generate the comparison signal COM. If a phase difference between the input clock signal CLK_IN and the input data signal DIN is greater than the predetermined delay time Td, the comparison signal COM may be enabled to adjust the second delay time. If the second delay time is adjusted such that a phase difference between the input clock signal CLK_IN and the input data signal DIN is less than the predetermined delay time Td, the comparison signal COM may be disabled. If the comparison signal COM is disabled, an operation for adjusting the second delay time may be terminated. As a result, the first switching unit 13 may output the clock signal CLK input through the first pad 11 as the selection clock signal SCLK and the second switching unit 23 may output the data signal DATA input through the second pad 21 as the selection data signal SDATA.

As described above, the receiving circuit according to the embodiments may execute a simulation operation for adjusting the second delay time such that a phase difference between the input clock signal CLK_IN and the input data signal DIN is less than the predetermined delay time Td. The simulation operation may adjust the second delay time to reduce a skew between the input data signal DIN and the input clock signal CLK_IN. Thus, the receiving circuit according to the embodiments may reduce the chance of errors in determining the logic level of the data signal DATA input through the second pad 21 in synchronization with the clock signal CLK input through the first pad 11.

Figure 6:
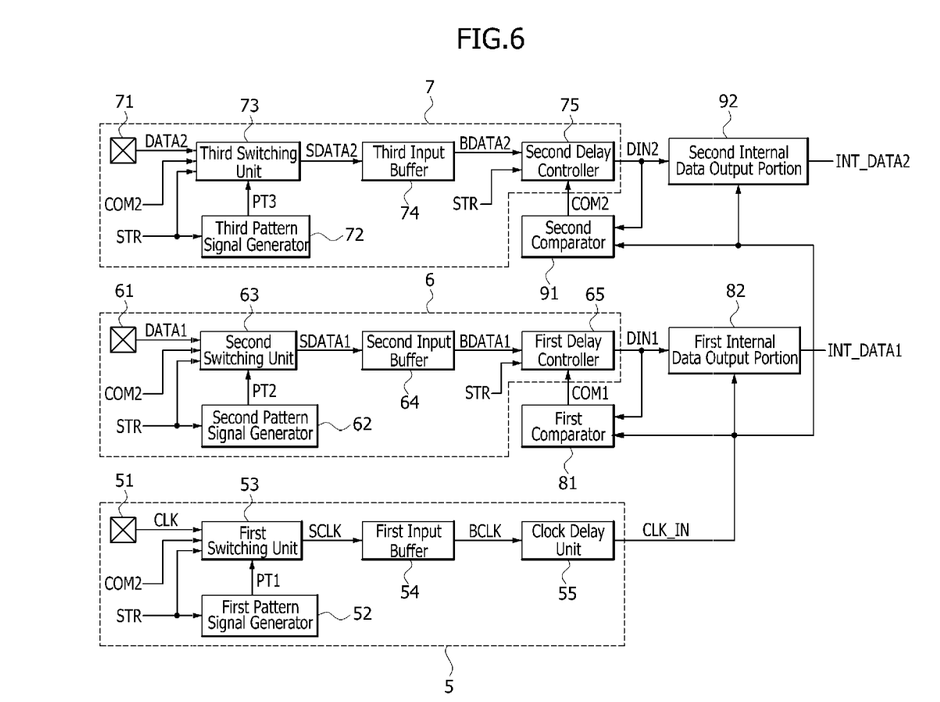
FIG. 6 is a block diagram illustrating a configuration of a receiving circuit according to further embodiments.

FIG. 6 is a block diagram illustrating a configuration of a receiving circuit according to further alternative embodiments. The embodiment of FIG. 6 includes two data signals, and enables the skew between the clock and each data signal to be adjusted. This adjustment may be done by a delay controller and comparator such as the delay controller of FIG. 2 and the comparator of FIG. 3. In alternative embodiments, any suitable delay controller and/or comparator may be used. As illustrated in FIG. 6, a receiving circuit according to another embodiment may be configured to include a clock input portion 5, a first data input portion 6, a second data input portion 7, a first comparator 81, a first internal data output portion 82, a second comparator 91 and a second internal data output portion 92. The clock input portion 5 may be configured to include a first pad 51, a first pattern signal generator 52, a first switching unit 53, a first input buffer 54 and a clock delay unit 55. The first data input portion 6 may be configured to include a second pad 61, a second pattern signal generator 62, a second switching unit 63, a second input buffer 64 and a first delay controller 65. The second data input portion 7 may be configured to include a third pad 71, a third pattern signal generator 72, a third switching unit 73, a third input buffer 74 and a second delay controller 75.

The first pattern signal generator 52 may generate a first pattern signal PT1 in response to a pulse of a starting signal STR. The second pattern signal generator 62 may generate a second pattern signal PT2 in response to the pulse of the starting signal STR. The third pattern signal generator 72 may generate a third pattern signal PT3 in response to the pulse of the starting signal STR. In the embodiment of FIG. 6, the first, second and third pattern signals PT1, PT2 and PT3 may be generated to have the same waveform. However, in alternate embodiments, the first, second and third pattern signals PT1, PT2 and PT3 may be generated to have different cycle times and different pulse widths from each other. The pulse of the starting signal STR may be generated for a simulation operation that generates a first internal data signal INT_DATA1 and a second internal data signal INT_DATA2 according to the first, second and third pattern signals PT1, PT2 and PT3.

In the embodiment of FIG. 6, then, the first switching unit 53 may output the first pattern signal PT1 as a selection clock signal SCLK in response to the pulse of the starting signal STR when a second comparison signal COM2 is enabled. The second switching unit 63 may output the second pattern signal PT2 as a first selection data signal SDATA1 in response to the pulse of the starting signal STR when the second comparison signal COM2 is enabled. The third switching unit 73 may output the third pattern signal PT3 as a second selection data signal SDATA2 in response to the pulse of the starting signal STR when the second comparison signal COM2 is enabled. The first switching unit 53 may output a clock signal CLK input through the first pad 51 as the selection clock signal SCLK when the second comparison signal COM2 is disabled after receiving the pulse of the starting signal STR. The second switching unit 63 may output a first data signal DATA1 input through the second pad 61 as the first selection data signal SDATA1 when the second comparison signal COM2 is disabled after receiving the pulse of the starting signal STR. The third switching unit 73 may output a second data signal DATA2 input through the third pad 71 as the second selection data signal SDATA2 when the second comparison signal COM2 is disabled after receiving the pulse of the starting signal STR.

The first input buffer 54 may buffer the selection clock signal SCLK to generate a buffer clock signal BCLK. The second input buffer 64 may buffer the first selection data signal SDATA1 to generate a first buffer data signal BDATA1. The third input buffer 74 may buffer the second selection data signal SDATA2 to generate a second buffer data signal BDATA2. The clock delay unit 55 may retard the buffer clock signal BCLK by a first delay time to generate an input clock signal CLK_IN. The first delay controller 65 may retard the first buffer data signal BDATA1 by a second delay time to generate a first input data signal DIN1. The second delay controller 75 may retard the second buffer data signal BDATA2 by a third delay time to generate a second input data signal DIN2. The second delay time may be adjusted according to the starting signal STR and the first comparison signal COM1, and the third delay time may be adjusted according to the starting signal STR and the second comparison signal COM2. The first and second delay controllers 65 and 75 may be realized to have substantially the same configuration as the delay controller 25 illustrated in FIG. 2.

The first comparator 81 may compare a phase of the input clock signal CLK_IN with a phase of the first input data signal DIN1 to generate the first comparison signal COM1. The first internal data output portion 82 may latch the first input data signal DIN1 in synchronization with the input clock signal CLK_IN to generate the first internal data signal INT_DATA1. The second comparator 91 may compare a phase of the input clock signal CLK_IN with a phase of the second input data signal DIN2 to generate the second comparison signal COM2. The second internal data output portion 92 may latch the second input data signal DIN2 in synchronization with the input clock signal CLK_IN to generate the second internal data signal INT_DATA2.

As described above, the receiving circuit according to the embodiments may execute simulation operations for adjusting the first and second delay times such that phase differences between the input clock signal CLK_IN and the first input data signal DIN1 as well as between the input clock signal CLK_IN and the second input data signal DIN2 are less than the predetermined delay time Td. The simulation operations may adjust the first and second delay times to reduce skews between the input data signals DIN1 and DIN2 and the input clock signal CLK_IN. Thus, the receiving circuit according to the embodiments may correctly discriminate between the logic levels of the first and second data signal DATA1 and DATA2 input through the second and third pads 61 and 71 in synchronization with the clock signal CLK input through the first pad 51.

The example embodiments of the inventive concept have been disclosed above for illustrative purposes. Those skilled in the art will appreciate that various modifications, additions and substitutions are possible, without departing from the scope and spirit of the inventive concept as disclosed in the accompanying claims.

What is claimed is:

1. A receiving circuit comprising:
   a clock input portion configured to buffer a first pattern signal and configured to retard the buffered first pattern signal by a first delay time to generate an input clock signal;
   a data input portion configured to buffer a second pattern signal and configured to retard the buffered second pattern signal by a second delay time to generate an input data signal;
   a comparator configured to compare a phase of the input clock signal with a phase of the input data signal to generate a comparison signal for adjusting the second delay time; and
   an internal data output portion configured to latch the input data signal in synchronization with the input clock signal to generate an internal data signal.

2. The receiving circuit of claim 1, wherein the first pattern signal and the second pattern signal are generated to have the same signal.

3. The receiving circuit of claim 2, wherein the comparison signal is enabled when a phase difference between the input data signal and the input clock signal is greater than a predetermined delay time.

4. The receiving circuit of claim 3, wherein when the comparison signal is enabled, the clock input portion selects the first pattern signal as a selection clock signal and buffers and retards the selection clock signal by the first delay time to generate the input clock signal.

5. The receiving circuit of claim 4, wherein the clock input portion includes:
   a pattern signal generator configured to generate the first pattern signal in response to a starting signal;
   a switching unit configured to output a clock signal input through a first pad or the first pattern signal as the selection clock signal in response to the starting signal and the comparison signal;
   an input buffer configured to buffer the selection clock signal to generate a buffer clock signal; and
   a clock delay unit configured to retard the buffer clock signal by the first delay time to generate the input clock signal.

6. The receiving circuit of claim 5, wherein the pattern signal generator is configured to stop a generation of the first pattern signal when the starting signal is disabled.

7. The receiving circuit of claim 6, wherein the switching unit is configured to output the clock signal as the selection clock signal when the comparison signal is disabled.

8. The receiving circuit of claim 3, wherein the second delay time is adjusted when the comparison signal is enabled.

9. The receiving circuit of claim 4, wherein when the comparison signal is enabled, the data input portion selects the second pattern signal as a selection data signal and buffers and retards the selection data signal by the second delay time to generate the input data signal.

10. The receiving circuit of claim 9, wherein the data input portion includes:
    a pattern signal generator configured to generate the second pattern signal in response to a starting signal;
    a switching unit configured to output a data signal input through a second pad or the second pattern signal as the selection data signal in response to the starting signal and the comparison signal;
    an input buffer configured to buffer the selection data signal to generate a buffer data signal; and
    a delay controller configured to retard the buffer clock signal by the second delay time to generate the input data signal.

11. The receiving circuit of claim 10, wherein the pattern signal generator is configured to stop a generation of the second pattern signal when the starting signal is disabled.

12. The receiving circuit of claim 11, wherein the switching unit is configured to output the data signal as the selection data signal when the comparison signal is disabled.

13. The receiving circuit of claim 10, wherein the delay controller includes:
    a shifting signal generator configured to generate shifting signals which are shifted in response to the starting signal and the comparison signal; and
    a delay selector configured to select the second delay time, and retard the buffer data signal by the second delay time in response to the shifting signals.

14. The receiving circuit of claim 1, wherein the comparator includes:
    a first latch part configured to latch the input data signal in synchronization with the input clock signal to output the latched input data signal as a first latch signal;
    a second latch part configured to latch a delay data signal in synchronization with the input clock signal to output the latched delay data signal as a second latch signal; and
    a logic part configured to generate the comparison signal in response to the first latch signal and the second latch signal,
    wherein the delay data signal is generated by retarding the input data signal by a predetermined delay time.

15. A receiving circuit comprising:
    a clock input portion configured to buffer a first pattern signal and configured to retard the buffered first pattern signal by a first delay time to generate an input clock signal;
    a first data input portion configured to buffer a second pattern signal and configured to retard the buffered second pattern signal by a second delay time to generate a first input data signal;
    a first comparator configured to compare a phase of the input clock signal with a phase of the first input data signal to generate a first comparison signal for adjusting the second delay time;
    a second data input portion configured to buffer a third pattern signal and configured to retard the buffered third pattern signal by a third delay time to generate a second input data signal; and a second comparator configured to compare a phase of the input clock signal with a phase of the second input data signal to generate a second comparison signal for adjusting the third delay time.

16. The receiving circuit of claim 15, wherein the first, second and third pattern signals are generated to have the same waveform.

17. The receiving circuit of claim 16, wherein the first comparison signal is enabled when a first phase difference between the input clock signal and the first input data signal is greater than a predetermined delay time, and the second comparison signal is enabled when a second phase difference between the input clock signal and the second input data signal is greater than the predetermined delay time.

18. The receiving circuit of claim 17, wherein the second delay time is adjusted when the first comparison signal is enabled, and the third delay time is adjusted when the second comparison signal is enabled.

19. The receiving circuit of claim 17, wherein when the second comparison signal is enabled, the clock input portion selects the first pattern signal as a selection clock signal and buffers and retards the selection clock signal by the first delay time to generate the input clock signal.

20. The receiving circuit of claim 19, wherein the third delay time is not adjusted when the second comparison signal is disabled.

21. The receiving circuit of claim 17, wherein when the first comparison signal is enabled, the first data input portion selects the second pattern signal as a selection data signal and buffers and retards the selection data signal by the second delay time to generate the first input data signal.

22. The receiving circuit of claim 17, wherein when the second comparison signal is enabled, the second data input portion selects the third pattern signal as a selection data signal and buffers and retards the selection data signal by the third delay time to generate the second input data signal.

23. A method for reducing skew in a receiving circuit, the method comprising:
    buffering a first pattern signal using a first input buffer;
    delaying the buffered first pattern signal by a first time delay using a clock delay unit to generate an input clock signal;
    buffering a second pattern signal using a second input buffer;
    delaying the buffered second pattern signal by a second time delay using a delay controller to generate an input data signal;
    comparing, using a comparator, a phase of the input clock signal with a phase of the input data signal to generate a comparison signal;
    adjusting the second delay time at the delay controller using the comparison signal; and
    latching the input data signal in synchronization with the input clock signal to generate an internal data signal.

24. The method of claim 23, wherein comparing the phase of the input clock signal with the phase of the input data signal comprises enabling the comparison signal upon determining that a phase difference between the input data signal and the input clock signal is greater than a predetermined delay time.

25. The method of claim 24 wherein adjusting the second delay time at the delay controller using the comparison signal comprises:
    generating shifting signals using a shifting signal generator which are shifted in response to the starting signal and the comparison signal; and
    delaying the buffered second pattern signal with a delay selector based on the shifting signals and the comparison signal.

* * * * *